United States Patent [19]
Kroehl et al.

[11] Patent Number: 5,437,850
[45] Date of Patent: Aug. 1, 1995

[54] METHOD FOR CALCINING MOIST GYPSUM

[75] Inventors: Paul Kroehl, Ravensburg; Heiko Lindner, Bochum, both of Germany

[73] Assignee: Sulzer-Escher Wyss GmbH, Ravensburg, Germany

[21] Appl. No.: 252,639

[22] Filed: Jun. 2, 1994

[63] Continuation of Ser. No. 952,899, filed as PCT/EP92/00607, Mar. 19, 1992, published as WO92/16468, Oct. 1, 1992, abandoned.

[30] Foreign Application Priority Data

Mar. 25, 1991 [DE] Germany .................. 41 09 743.2

[51] Int. Cl.⁶ ........................................... C04B 11/02
[52] U.S. Cl. ............................. 423/171; 106/772; 106/775; 106/786; 423/172; 423/555; 423/659
[58] Field of Search ............... 423/171, 172, 555, 659; 106/786, 772, 775

[56] References Cited

U.S. PATENT DOCUMENTS

| | | | |
|---|---|---|---|
| 3,156,455 | 11/1964 | Boulet | 423/171 |
| 3,437,330 | 4/1969 | Worner | 423/172 |
| 4,247,518 | 1/1981 | Charlet et al. | 423/171 |
| 4,455,285 | 6/1984 | Watkins et al. | 423/171 |
| 4,569,831 | 2/1986 | Cohen | 423/171 |
| 5,169,617 | 12/1992 | Clemens et al. | 423/172 |

FOREIGN PATENT DOCUMENTS

| | | | |
|---|---|---|---|
| 275443 | 9/1967 | Australia | 423/171 |
| 307075 | 6/1971 | U.S.S.R. | 423/172 |

*Primary Examiner*—Wayne Langel
*Attorney, Agent, or Firm*—Townsend and Townsend Khourie and Crew

[57] ABSTRACT

Both the drying and also the removal of the water crystalization take place carefully in a respective fluidized bed apparatus (A, B) without any danger of overheating. This is achieved by a complete homogenous fluidization through indirectly heated hot gas. A substantial quantity of energy is transferred via heat exchanger systems (4 or 12) in the fluidized layer. These are heated by heat carrying media. The constructional design of the fluidized bed apparatuses (A, B) which have a rectangular base outline ensures a narrow dwelltime spectrum and a pronounced temperature/moisture profile without the aid of differentially fluidized chambers. Because of the comparatively cold infeed zone and the careful heating which thereby arise the characteristics of the crystals are favourably influenced. The product is characterized by high quality homogeneity. In the case of the calcining of moist gypsum no undesired gypsum modifications arise.

9 Claims, 1 Drawing Sheet

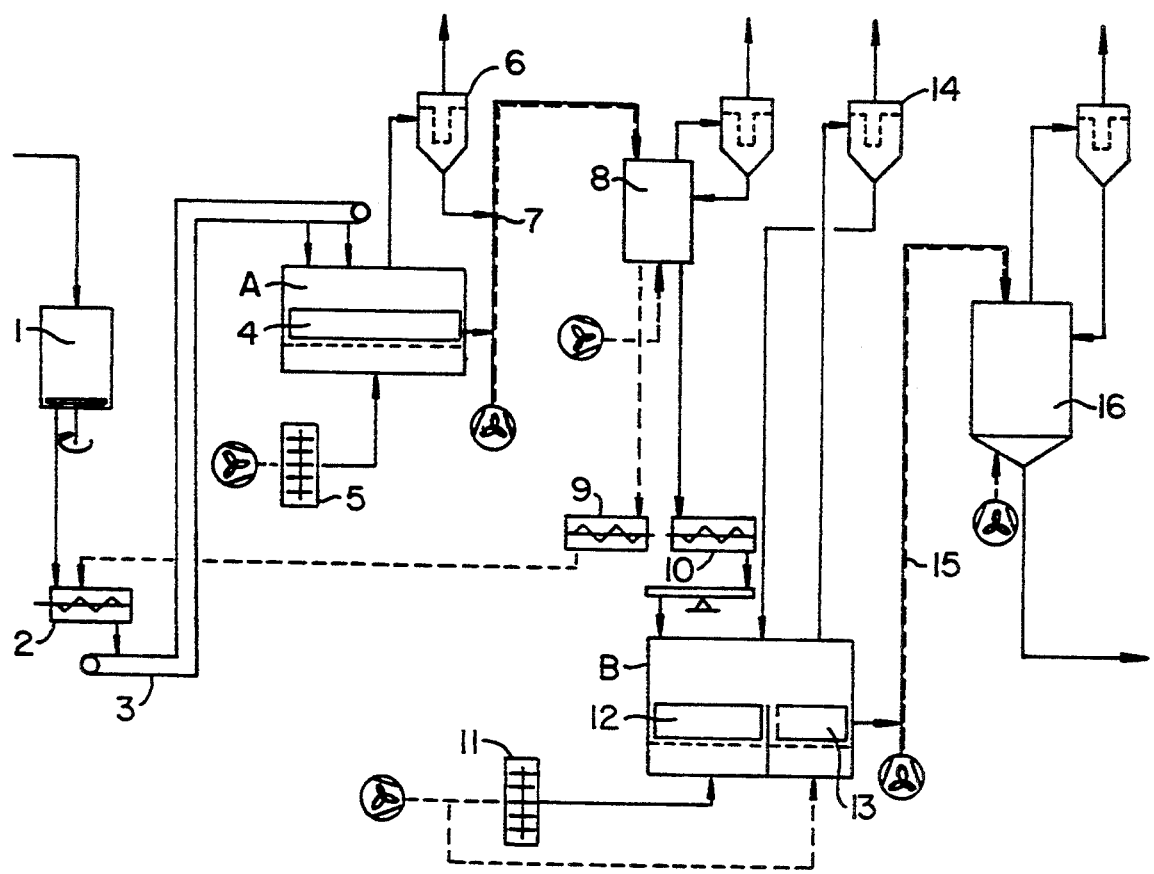

METHOD FOR CALCINING MOIST GYPSUM

This is a Continuation of application Ser. No. 07/952,899, filed Jan. 12, 1993, now abandoned.

BACKGROUND OF THE INVENTION

The invention relates to a method for the thermal treatment of moist hydrates.

A method of this kind is for example the so-called calcining of moist gypsum. Moist gypsum, i.e. calcium sulphate dehydrate, which also includes moist gypsum from flue-gas desulfurization plants can be surface-dried at temperatures up to 90° C. without removing the water of crystalisation. At temperatures up to about 145° C. the withdrawal of the water of crystalisation takes place, i.e. the dewatering to the hemihydrate. The alpha or beta modification of the hemihydrate thereby arises, depending on the water vapour partial pressure. Above this temperature there arises, depending on the temperature level, through full yielding up of the water of crystalisation, the anhydrate modifications, starting with the so-called A III gypsum, a very reactive component with a short setting time, followed by sluggishly reacting hardly soluble A II s and the inert A II u. These distinctions in the reactive behaviour are tributed to the surface characteristic which is changed by the thermal treatment.

In order to obtain calcined gypsum with a constant and/or pure phase composition it is thus important to precisely control the temperature profile during manufacture. No overheating and no inhomogenities are permitted during the thermal treatment which with individual particles of the material could lead to undesired phase conversions. This applies to all thermal steps, i.e. also to drying.

There are presently no methods with which the above named maxima can really be satisfied. No methods have separate drying and calcining stages. For the drying stage flow tubes or combinations of heated mixers and flow tubes are used which are operated with flue gases or with indirectly heated gases of over 200° C. For the contact surface heating which is used the customary heat transfer medium for example oil or steam are used from about ca. 150° C. upwards. It is not possible to prevent the material being at least partially overheated through too long contact with hot gas flows or heated surfaces and the undesired phases, for example A III, A II, already form here during the drying.

For the calcining so-called cookers, drums, rotary tubes with heated surfaces ("steam tube") and also diverse furnace types are used. Directly fired drums and furnaces originate from the conventional gypsum burning technology and are only suitable for lump material.

Cookers and steam tubes are charged with a fluidizable gypsum powder (granulate) such as arises from flue gas desulfurising plants.

Characteristic for the said apparatus is either the direct firing with hot gases (flue gases or air) as a rule over 400° C. and/or the incomplete fluidization in the area of heated surfaces.

In this way one arrives in just the same way as the dryers to local overheating and uncontrolled formation of multiphase gypsum. Moreover flue gases are not inert and no controlled atmosphere (for example $H_2O$ partial pressure can be set). These disadvantages of the calciners are adequately known and thus the subject of improvement proposals. In practice one compensates for these process disadvantages in that one subsequently influences the product characteristics by the differential addition of additives, so-called set-up agents, or by additional method steps (grinding, cooling).

The known proposals are aimed at removing the detrimental excess temperature from flue gases by prior indirect heat exchange, at using fluidized bed apparatus to intensify and homogenize the heat transfer and also not allowing flue gases to come into contact with the product.

Thus a fluidized bed apparatus operated with hot air is described in FR-PS 1 338 126 which can however only incompletely solve with a steering mechanism the fluidization problems in the infeed zone, whereby again the danger of local overheating exists, and indeed in particular at the flue gas streams leading through the layer. The process of DE-PS 37 21 421, a fluidized bed with an inert granulate filling, such as for example sand and gas side circulation circuit, avoids these disadvantages. DE-PS 26 22 994 describes a fluidized bed apparatus which attempts to improve the inhomogeneous product quality by smoothing the dwelltime with the aid of chambers. This apparatus has the disadvantage that in order to achieve an adequate drying power and a degree of efficiency it is necessary to operate with high hot gas temperatures—with the known danger of overheating.

In GB 2 027 859 A an apparatus similar to a cooker is offered which cools down the flue through heat exchange surfaces in the product layer before the flue gases are used for (partial) fluidization. The DE-OS 37 38 301 picks up this principle of indirect heat exchange. Moreover, an indirectly heated hot gas is used for fluidization, no flue gas, and an attempt is made to homogenize the dwelltime to differentially fluidized chambers. In these two processes the danger of overheating at the heat transferring walls also arises, in particular with partial or differential fluidization. Moreover all previously described processes —with the exception of the granulate fluidized bed (DE-PS 37 21 421)—require a conventional dried and thus, as explained above, already damaged dihydrate powder.

SUMMARY OF THE INVENTION

It is the object of the invention to improve the method for the thermal treatment of moist hydrates in order to controllably arrive at the desired result with respect to the withdrawal of the water of crystalization. In particular a calcined gypsum with constant and/or pure phase composition should be controllably manufactured, with an inhomogeneous treatment being avoided with this process to a large degree which is also intended to lead to a homogenous product qualitywise.

This object is satisfied in accordance with the invention for thermal treatment of moist hydrates, in which water is withdrawn from the hydrates by fluidizing the hydrate with hot gas and by contacting the hydrates with the heat exchange surfaces. The surface water of the hydrates is vaporized at a low temperature level in a first fluidized bed apparatus and thereafter, the water of crystallization is withdrawn at a low temperature level from the hydrates in a second fluidized bed apparatus. The heat, introduced into both apparatus via the hot gas and the heat exchange surfaces, which are disposed in the fluidized bed, is supplied in the majority via the heat exchange surfaces.

With this process the disadvantages mentioned above with respect to the calcining of the moist gypsum are avoided. Both drying and also the removal of the water of crystalization take place carefully in a fluidized bed apparatus in each case without any danger of even partial overheating. This is achieved by a complete homogenous fluidization through indirectly heated hot gas of low temperature. A substantial quantity of energy is transferred through heat exchanger surfaces in the fluidized layer, with the surfaces being heated if required to a low temperature level, preferably to for example ca. 200° C. by media such as saturated steam or heat transfer oil. A particularly advantageous constructive design of the apparatus with a rectangular base ensures a narrow dwelltime spectrum and a pronounced temperature/moisture profile without the aid of differentially fluidized chambers. Because of the comparatively cold infeed zone which thereby arises, and the careful heating, the surface characteristics of the crystals are favourably influenced.

The fluidized bed consists of the material to be treated, for example a gypsum granulate itself. No auxiliary material or mechanical aids (such as stirrers) are required. The reliable manner of operation is achieved by a deep layer of fluidized bed, for example 0.5 to 1.5 m. In order to be able to also dry high moisture hydrates it is necessary to mix such materials with recycled surface-dried material to a non-critical moisture content prior to feeding them into the drying stage and to so distribute the infed material that the specific surface loading does not disturb the fluidization. This can be brought about in advantageous manner by a plurality of infeed positions and/or momentum attenuating or distributing inbuild structures in the layer.

The regulation of the fluidized bed temperature can be effected either via the throughput of the product or by the temperature of the heat transfer medium. In the case of moist gypsum a surface-dried dihydrate with the full content of water of crystalization is achieved at a product temperature of approximately 90° C. With this starting material it is possible to manufacture in the calciner, i.e. in the second fluidized bed apparatus, simply by variation of the outlet temperature, which can be kept in narrow limits, any desired gypsum quality: pure beta hemihydrate, two-phase gypsums with beta hemihydrate and depending on the temperature different contents of A III and also multiphase gypsum with beta hemihydrate, A III and A II components right up to pure A II. A cooling zone can be located at the discharge end of the calciner, integrated into the calciner, which cools the product to moderate temperatures and moreover offers the possibility of carrying out an aridizing or aging the product by the intentional addition of moisture.

BRIEF DESCRIPTION OF THE DRAWING

FIG. 1 is a schematical illustration of a plant for carrying out a process according to the principles of the present invention.

DESCRIPTION OF THE PREFERRED EMBODIMENT

In the following an embodiment of the method of the invention will be described and explained in more detail. The description relates to FIG. 1 in which is schematically illustrated a plant for carrying out an embodiment, namely the calcining of moisture gypsum.

A mechanically dewatered moist gypsum from a flue gas desulfurising plant and coming from the moist material silo 1 is mixed together with already surface-dried dihydrate in the mixer 2 to a non-critical moisture content so that the granulate is readily fluidizable. This granulate is fed into a first fluidized bed apparatus A, i.e. into the drier, at two positions via a conveyor means 3. The fluidizing air is heated in a heating register 5 to a 150° C. A substantial quantity of energy is supplied to the fluidized layer in the drier A by the heat exchanger system 4. The dust in the exhaust air from the drier A is removed in a filter or cyclone 6. The dust is conveyed together with the surface-dried dehydrate from the drier A pneumatically via a duct 7 to a dry material silo 8. A part quantity is branched off and via a conveyor screw 9 has add-back-material to the mixer 2. The remainder of the material from the dry material silo passes via a metering apparatus 10 into a second fluidized bed, i.e. into the calciner B. The fluidizing air for the hot part of the fluidized bed B is heated by a register 11 in accordance with a desired degree of calcination. The fluidizing air for a cooling zone integrated into the fluidized bed apparatus B is not heated. A substantial quantity of energy is fed into the hot part of the calciner B via a heat exchanger system 12 in accordance with the desired calcining goal, the important quantity of energy is led away from the cooling zone via the heat exchanger system 13. Dust is removed from the exhaust air from the calciner B into the cyclone 14 and the dust is—in correspondence with the degree of calcining the material—fed back into the material layer at a suitable position. The finished calcined cooled gypsum passes via pneumatic ducts 15 into an end product silo 16 and can be removed there for further processing.

The fact that the embodiment was conceived for dihydrate from flue gas desulfurising plants, for which the method is particularly suited, does not preclude the use of the method for the calcining of other forms of the gypsum dihydrate species. The method can also be used with the described advantages. Other moist hydrates can also be treated in the manner of the invention as set forth with the mentioned advantages.

We claim:

1. A method for thermally treating moist hydrates comprising the steps of:

feeding moist hydrates into a first fluidized bed apparatus having a static heat exchanger including heat exchange surfaces disposed in the apparatus;

vaporizing the surface water of the hydrates in the first fluidized bed apparatus to form surface-dried hydrate by a complete homogenous fluidization of the hydrates with hot gas and by heating the heat exchange surfaces and contacting the fluidized hydrates with the heat exchange surfaces, the majority of the heat introduced into the apparatus via the hot gas and heat exchange surfaces being from the heat exchange surfaces;

conveying surface-dried hydrate from the first fluidized bed apparatus to a second, separate fluidized bed apparatus having a static heat exchanger including heat exchange surfaces disposed in the apparatus; and withdrawing the water of crystallization from the surface-dried hydrate in the second fluidized bed apparatus by a complete homogenous fluidization of the surface-dried hydrate with hot gas and by heating the heat exchange surfaces in the second apparatus and contacting the fluidized surface-dried hydrate with the heat exchange surfaces in the second apparatus, the majority of the heat introduced into the second fluidized bed apparatus via the hot gas and heat exchange surfaces being from the heat exchange surfaces.

2. The method of claim 1 further including the steps of mechanically dewatering the hydrate before feeding it into the first fluidized bed apparatus, conveying the dewatered hydrate to a station upstream from the first fluidized bed apparatus, conveying surface-dried hydrate from the first fluidized bed apparatus to the said station, mixing the dewatered hydrate and surface-dried hydrate at said station to prepare a material which is readily fluidizable in the first apparatus, and feeding the material into the first fluidized bed apparatus.

3. The method of claim 2 wherein the feeding step includes feeding said material into the first fluidized bed apparatus at a plurality of positions above the fluidized bed of material formed by the hot gas.

4. The method of claim 1 wherein the feeding step includes feeding the hydrate into the first fluidized bed apparatus at a plurality of positions above the fluidized bed of hydrate formed by the hot gas.

5. The method of claim 1 wherein each fluidized bed apparatus is provided with a rectangular configuration to achieve a narrow dwelltime spectrum of the hydrates.

6. The method of claim 1 wherein moist gypsum is used as the moist hydrate, only surface water of the moist gypsum is vaporized in the first fluidized bed apparatus to produce dried gypsum and the crystallization water content of the dried gypsum is reduced in the second fluidized bed apparatus to produce calcined gypsum.

7. The method of claim 6 wherein the calcined gypsum is cooled before being discharged from the second fluidized bed apparatus by gas introduced into the second fluidized bed apparatus to maintain the calcined gypsum in a fluidized bed and another heat exchanger having heat exchange surfaces in the fluidized bed of calcined gypsum when the gas is introduced to maintain the fluidized bed of calcined gypsum.

8. The method of claim 1 wherein the hot gas introduced into each apparatus is heated indirectly.

9. A method for thermally treating moist gypsum comprising the steps of:

feeding moist gypsum into a first fluidized bed apparatus having heat exchanger surfaces;

vaporizing the surface water of the gypsum in the first fluidized bed apparatus at a product temperature less than or equal to about 90° C. to form surface-dried gypsum by a complete homogenous fluidization of the gypsum with hot gas and by heating the heat exchanger surfaces and contacting the fluidized gypsum with the heat exchanger surfaces without using any mechanical aids;

conveying the surface-dried gypsum from the first fluidized bed apparatus to a second, separate fluidized bed apparatus having heat exchanger surfaces; and withdrawing the water of crystallization from the surface-dried gypsum in the second fluidized bed apparatus by a complete homogenous fluidization of the surface-dried gypsum with hot gas and by heating the heat exchange surfaces in the second apparatus and contacting the fluidized surface-dried gypsum with the heat exchange surfaces in the second apparatus without using any mechanical aids.

* * * * *